Figure 1:
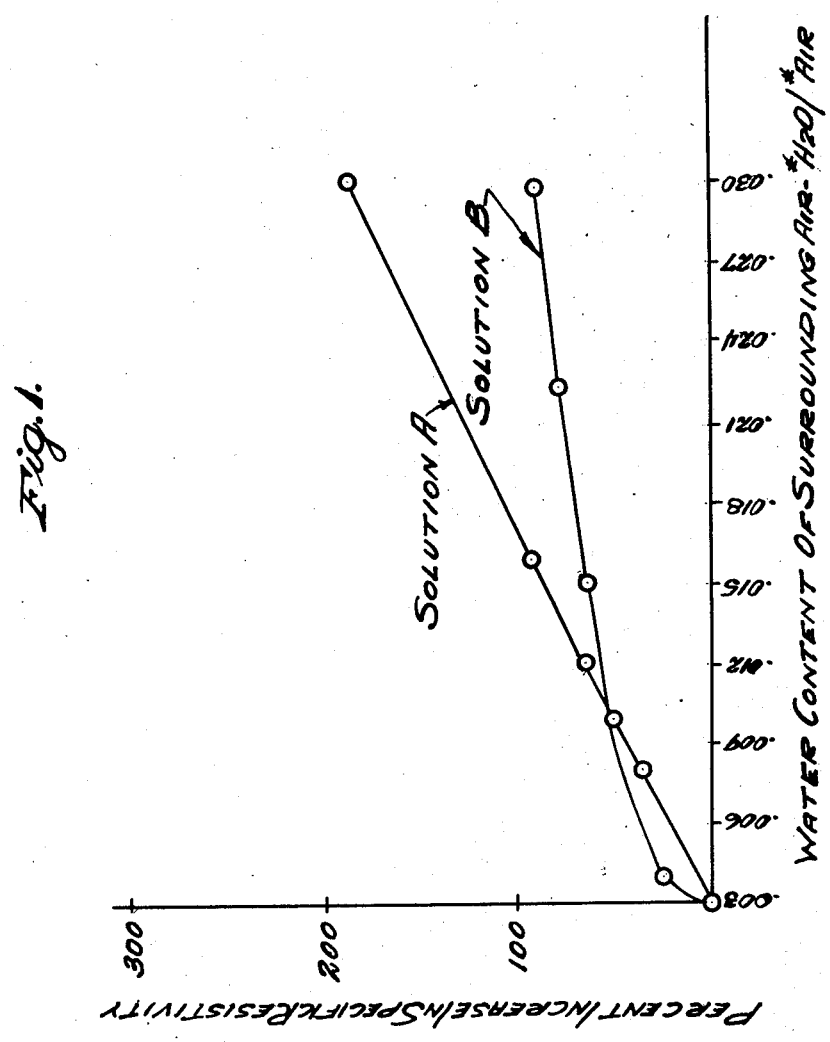

Sept. 8, 1953

W. O. LYTLE ET AL 2,651,585

PRODUCTION OF ELECTROCONDUCTIVE ARTICLES

Filed June 25, 1949

2 Sheets-Sheet 1

Inventors
WILLIAM O. LYTLE and
ALBERT E. JUNGE

By

Olen E. Bee

Attorney

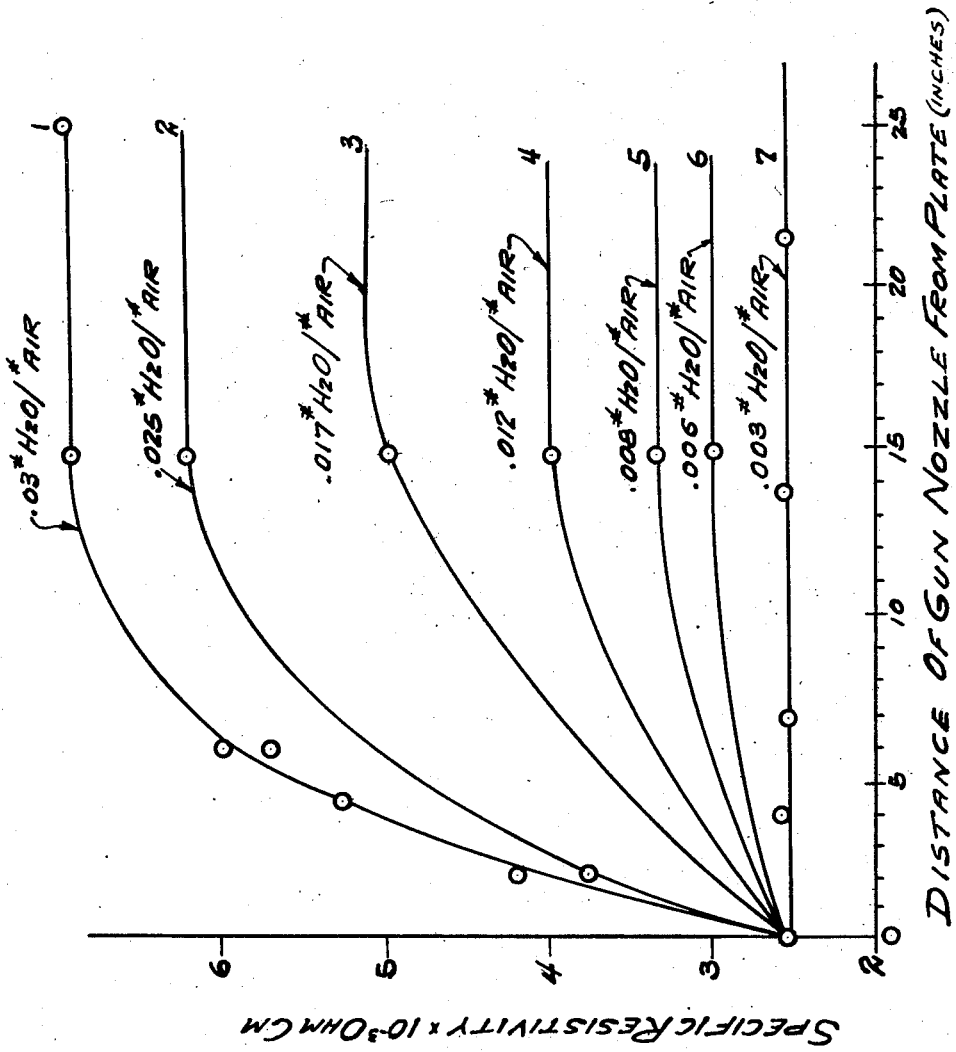

UNITED STATES PATENT OFFICE 2,651,585

PRODUCTION OF ELECTROCONDUCTIVE ARTICLES

William O. Lytle and Albert E. Junge, New Kensington, Pa., assignors to Pittsburgh Plate Glass Company Application June 25, 1949, Serial No. 101,452

2 Claims. (Cl. 117—54)

The present invention is concerned with a novel method of preparing electroconductive transparent films or coatings upon transparent articles or other refractory articles. Transparent electroconductive films, having thicknesses of about 25 to 800 millimicrons, may be deposited upon glass by heating the glass to an elevated temperature above 400° F., usually in the neighborhood of 800 to 1300° F., and spraying the hot glass with stannic chloride. However, the production of films which have optimum clarity and resistivity have offered certain problems. Thus, in commercial production of a large number of units (particularly units of size sufficient to permit use as viewing closures or windshields in automative vehicles or aircraft), the clarity and conductivity of films deposited vary quite widely, frequently beyond acceptable tolerances. The cause of this variation has not been understood.

From an investigation of temperature as a variable, it has been found that films having optimum maximum conductivity are produced using stannic chloride alone, when the glass or similar base is heated to a temperature of about 1300° F. In such a case, the resistivity of the coating obtained ranges approximately 0.004 to 0.008 ohm-centimeters.

The problem of providing lime soda glass bases with films having minimum resistivity has been complicated by the fact that at the optimum temperature (1300° F.) lime soda glass is too soft and tends to distort seriously. This difficulty may be reduced by recourse to alcohols, such as methanol, ethanol, butanol, etc., which serve to reduce the temperature at which films of optimum resistivity may be obtained. Using such alcohols, it is possible to obtain films in the range of 0.0025 to 0.005 ohm-centimeters, at temperatures in the range of 850 to 1150° F. This permits deposition of films of optimum conductivity upon lime soda glass without the distortion or warping which would accompany treatment at a higher temperature.

The specific resistivity of the electroconductive films produced by stannic chloride may be improved to a substantial degree by use of modifiers in conjunction with the stannic chloride. For example, antimony trichloride or equivalent trivalent antimony compound, when present in small amounts usually ¼% to 5% of the stannic chloride, reduces the resistivity of the films produced. Furthermore, metal and acid fluorides, such as hydrogen fluoride, ammonium fluoride, sodium fluoride, sodium hydrogen fluoride, etc., may be used in conjunction with stannic chloride to produce electroconductive films which have the surprisingly low resistivity of 0.0003 to 0.002 ohm-centimeters, depending upon the amount of fluorine compound which is present.

Notwithstanding the use of optimum temperature conditions and one or more of the above agents, irregular results have been obtained in commercial or semi-commercial scale operations. In this connection, several difficulties have been observed. Thus, it has been observed that the resistivity of electroconductive films produced varies widely. A further difficulty arises from the fact that some films possess an unusual amount of haze which impairs visibility through the film to the extent that the film coated article is unsuitable for use. Moreover, the adhesion of the film to the glass is poor, often resulting in peeling of the film from the base. The wide variation in resistivity, freedom from haze, clarity and adhesion of the films which have been produced has seriously complicated the problem of producing articles having adherent, well bonded, electroconductive films which are within predetermined standards of resistivity, transparency, clarity, adhesion, and freedom from haze. Variation in articles produced from day to day has been unduly great.

In accordance with this invention, it has been found that more uniformity may be obtained in the conductivity, transparency, clarity and adhesion of electroconductive films by conducting the film forming operations while the water content of the atmosphere adjacent the plate to be coated remains within certain predetermined limits. Despite the fact that the spraying solutions of stannic chloride frequently contain water in appreciable amount, it has been found that the amount of water in the atmosphere and in the air supplied to the spray gun has a surprising effect upon the properties of the film which is produced. Thus, it has been found, according to this invention, that improved results may be obtained by controlling the water content of the atmosphere at the point of spraying whenever atmospheric humidity is excessive as, for example, during the summer.

The permissible range of water content depends to some extent upon the composition of the solution being sprayed, the distance of the spray gun to the plate to be coated, and also upon the results desired. Thus, it has been found that anhydrous spraying solutions are less susceptible to humidity variation than are aqueous solutions, which usually contain 5 to 60 percent by weight of water. Moreover, high humidity appears to effect film adhesion and degree of haze more adversely than film resistivity. Hence, the humidity limit is determined to some degree by the results desired and the composition of the spraying solution.

In order to ensure good adhesion, resistivity, and freedom from haze, the water content of the air surrounding the glass at the time of spray should be less than 0.01 pound per pound of air. Best and most uniform results are obtained when the water content of the air is below 0.005 pound of water per pound of air,. Hence, maintenance of the water content of the atmosphere below these maximums ensures production of products which are more uniform in resistivity and more consistently free from haze and peeling.

To ensure rapid film formation, some water should be present in the air. Hence, it is preferred that the water content of the atmosphere at the area of spray should be above about 0.00025 to 0.001 pound per pound of air. Water content is determined by conventional wet bulb determinations, prior to spraying of the plates at the locus of spray.

The effect of the presence of water in the atmosphere is illustrated by the graphs in the accompanying drawings, in which Fig. 1 is a diagram illustrating the variation of the specific resistivities of films produced by solutions A and B, with the water content of the surrounding atmosphere.

Fig. 2 is a family of graphs illustrating the effect of the distance between the nozzle of the spray gun and the plate to be film coated, upon the resistivity of the film, for atmospheres of different water contents.

The graphs illustrated in Fig. 1 were determined in the following manner:

A series of plate glass plates, 8 inches by 8 inches by ¼ inch, were sprayed according to the detailed procedure set forth in the ensuing example. The plates to be coated were heated in a furnace to a temperature of 1230° F. and the heated plates were removed from the furnace and immediately sprayed with an amount of the solution sufficient to produce a film having a thickness indicated by first order red of interference colors, the time of spraying usually being about 3 seconds, and the volume of solution sprayed being about 2 to 3 cubic centimeters. The plates were sprayed in an atmosphere in which the water content of the air was controlled to desired values. In this series of tests, the temperature of the atmosphere in which the plates were to be disposed was observed to be 75 to 85° F. Tests were conducted, using atmospheres containing from 0.003 to 0.030 pound of water per pound of air, the designated circled points on the curves indicating the exact water contents tested. A conventional spray gun was used at an air pressure of 25 pounds per square inch; the distance from the plate to the muzzle of the gun being 15 inches.

After the plates had been sprayed, they were permitted to cool. The films thus obtained were about 80 millimicrons in thickness. The specific resistivity of films produced using solution A, at a water content of 0.003 pound of water per pound of air, was 0.0025 ohm centimeters. The specific resistivity of the film produced by solution B, at the same water content, was 0.0003 ohm centimeters. The increase in specific resistivities, with increase in water content of the atmosphere in which spraying was conducted, were as indicated in the graph.

The compositions of these solutions were as follows:

Solution A

| | | |
|---|---|---|
| Stannic chloride pentahydrate | grams | 900 |
| Methanol | milliliters | 63 |
| Phenyl hydrazine | grams | 21 |
| Dioctyl sodium sulphosuccinate solution | milliliters | 30 |

The dioctyl sodium sulphosuccinate solution was prepared by mixing:

| | | |
|---|---|---|
| Dioctyl sodium sulphosuccinate | grams | 10 |
| Methanol | milliliters | 45 |
| Water | do | 45 |

Solution B

| | | |
|---|---|---|
| Anhydrous stannic chloride | cubic centimeters | 1000 |
| Methanol (anhydrous) | do | 2000 |
| Ammonium acid fluoride | grams | 60 |
| Butyl carbitol acetate | cubic centimeters | 3000 |

From the graphs of Fig. 1, it will be apparent that, at water content of 0.012 pound of water per pound of air, the specific resistivity of the films produced by solution A has increased more than 50 percent, and the same is true of films produced from solution B at water content of 0.015 pound per pound of air. Such an increase might not be objectionable where no requirement for products having minimum resistivity is necessary. However, for most purposes, approximation of minimum resistivity is desirable and thus an increase of more than 50 percent in specific resistivity becomes undesirable; therefore, the water content of the atmosphere should not exceed 0.01 pound of water per pound of air.

It will be further understood, however, that articles of standard conductivity may be prepared in the presence of an atmosphere having water content above 0.01, but the resistivity of the film produced will be comparatively high. Uniformity in production of such articles may be achieved by standardizing conditions of humidity, usually within limits plus or minus 0.002 (preferably 0.001) pound of water per pound of air of an established norm. For example, articles having relatively high resistivity may be manufactured at standard atmospheric water content at a norm such as 0.02±0.002 pound of water per pound of air, without excessive variation of specific resistivity from article to article. Hence, the variation of water content from day to day, or even month to month, is held less than 0.004 pound per pound of air.

As shown in Fig. 2, the adverse effect of high humidity or water content of the atmosphere in which coating operations are conducted may be compensated for, to some degree, by adjusting the distance between the muzzle of the spray nozzle and the plate being coated. The graphs illustrated in Fig. 2 show the change which occurs in the specific resistivity of electroconductive films produced by solution A at the atmospheric water contents of 0.003, 0.006, 0.008, 0.012, 0.017, 0.025, and 0.03 pound of water per pound of air in the atmosphere in which spraying is conducted. The points indicated in the graphs were determined, as described above, at the designated water contents and nozzle distances.

From the graphs, it is shown that where the nozzle is quite close (for example, 3 inches distant) to the plate being coated, the increase in resistivity with increased water content is less than where the plate is 10 to 25 inches. However, such a close spacing of the nozzle from the plate is not practical except for small plates, since a single sweep of the spray over the plate does not coat the entire plate surface.

The spraying operation normally is conducted with a conventional type of spray gun, usually one which operates by virtue of a supply of compressed air to the nozzle of the gun. Improved standardization of the resistivity of the product is obtained if the air is free from suspended droplets of water. Since compressed air frequently contains such suspended droplets, a proper trap or other mechanism should be provided to prevent transfer of such droplets to the spray gun. The water content of the compressed air should be below 0.005 pound of water per pound of air or, if higher, should be no greater than the water content of the atmosphere in which spraying is conducted. Compressed air having too high water content should be dried before using.

In the performance of the process, sheets of glass, such as lime soda glass, are heated to an elevated temperature above 400° F., usually in the range of 850 to 1250° F. Higher temperatures may be used, provided the glass does not soften, warp or distort at the heating temperature, or if distortion of the glass is not an undesirable factor. Tendency to warp or distort will depend, to a large degree, upon the nature and also upon the thickness of the glass undergoing treatment. For example, sheets 1/8 inch thick will not withstand heating at a temperature at which sheets 1/4 inch thick may be heated with impunity. Furthermore, certain glasses, such as borosilicate glass, have higher temperature stability.

Following the heating operation, which is usually effected by placing the glass in a furnace heated at the desired temperature for a period of two or three minutes, the glass is removed from the furnace and is sprayed in atmospheric air with stannic chloride, before substantial cooling can occur.

In a typical example, a sheet of glass of any suitable size, for example, 12" by 12" by 3/64" was suspended vertically, and the glass sheet was heated in a furnace chamber at a temperature of 1250° F. until the sheet had been heated to 1230° F. A conventional spray gun was mounted outside the door of the furnace and filled with the solution A described above, a conventional air pressure of 25 pounds per square inch being supplied to the gun. Immediately after the heating, the glass sheet was removed from the furnace and held vertical in an atmosphere, the water content of which is 0.003 pound per pound of air and the temperature of which is 75° F., with its front face perpendicular to the nozzle. The gun was turned on and the hot glass was passed across the path of the spray, the nozzle of the gun being approximately 15 inches from the face of the glass sheet. The amount of solution which was sprayed on a plate of the above size was 8 cubic centimeters, and the spraying operation was effected in a matter of about four seconds. The resulting sheet may then be subjected to a conventional tempering operation if desired. The sheet so obtained has a transparent, tin oxide coating, about 80 millimicrons in thickness, which has a surface resistance of approximately 310 ohms per unit square. The specific resistivity of this coating is 0.0025 ohm centimeters. Thicker films may be produced by lengthening the period of spray.

Numerous other typical solutions may be used, in lieu of the solution set up above. In most cases, it has been found advantageous to make use of an aqueous stannic chloride solution which contains at least about 40% by weight of stannic chloride, based upon the total weight of the solution. Certain advantages accrue through use of solutions which contain water, in that less difficulty is encountered in handling the solutions. The water content will normally range from 5 to 150% by weight, based upon the weight of stannic chloride. Frequently it is advantageous to have present a quantity, usually ranging above 5% to 50% by weight, of an alcohol, based upon the weight of stannic chloride. Typical alcohols include: methanol, ethanol, isopropanol, N-propanol, isobutanol, normal butanol, tertiary butanol, allyl alcohol, methallyl alcohol, 2-ethyl allyl alcohol, benzyl alcohol, cinnamyl alcohol, or a glycol such as ethylene glycol, propylene glycol, N-butylene glycol, isobutylene glycol, trimethylene glycol, or the corresponding polyglycols of such glycols, or glycerol, or similar monohydric or polyhydric alcohols which preferably are water soluble and usually contain no more than 10 carbon atoms. Other compositions which may be present include aldehydes, such as formaldehyde, acetaldehyde, or other water soluble aldehyde, or water soluble ketones, such as acetone or methylethyl ketone. Fluorides, including the alkali metal fluorides and bifluorides, and hydrogen fluoride, may be present in amounts up to approximately 10% by weight of the stannic chloride. Hence, solutions having the following composition may be used:

*Solution No. 2*

Stannic chloride pentahydrate _____percent by weight__ 90.0
Formaldehyde, aqueous solution (containing 40% formaldehyde) _____do____ 10.0

*Solution No. 3*

Stannic chloride pentahydrate_____grams__ 900
Phenyl hydrazine hydrochloride_____do____ 21
Methanol_____millimeters__ 90

*Solution No. 4*

Anhydrous stannic chloride _____cubic centimeters__ 1,000
Methanol_____do____ 5,000
Ammonium bifluoride_____grams__ 100

It will be understood that the above solutions may be widely varied without substantial departure from the scope of the present invention.

The desired humidity control may be effected by conducting the spraying or coating operations in a room in which the humidity of the atmosphere therein is controlled within proper limits. However, this is not necessary, since the operations may be conducted in a room which is exposed to the ordinary atmosphere, provided proper precautions are observed. Thus, at certain times, climatic conditions are such that the humidity of atmospheric air is sufficiently low to achieve the purposes of this invention without adjustment and at certain times, notably in the summer, they are not. When the humidity of the general atmosphere becomes excessive, precautions must be taken to adjust the humidity of the atmosphere adjacent the plates to be coated, by artificial means, if coating operations are to be continued. Otherwise, coating operations should be discontinued until the absolute humidity falls to a proper level.

The humidity conditions under which the film is deposited may be determined readily by determining the absolute humidity of the atmosphere in the path of spray, by conventional methods. If the humidity becomes too high, certain precautions must be taken or film forming operations discontinued until proper humidity conditions are established.

Surprisingly enough, the effect of humidity upon the character of conductive coating is most marked when aqueous solutions of tin salts are used to deposit electroconductive films. Such solutions normally contain 5 to 60% water.

Anhydrous stannic chloride and similar anhydrous liquid solutions, such as solution B or solution No. 4 above, are less affected by humidity variation and, therefore, may be used satisfactorily in many cases where aqueous solutions cannot. Nevertheless, control of atmospheric water content and removal of suspended droplets from compressed air supplied to the spray gun are advantageous, even when anhydrous agents are used.

In the preceding disclosure, the invention has been described with particular reference to the production of the electroconductive films in atmospheric air. However, the process may be conducted in other gaseous atmospheres, such as nitrogen, carbon dioxide or the like. Moreover, the coating operation may be conducted using vapors of stannic chloride or like compound, in lieu of a spraying solution.

The invention as described is particularly concerned with the provision of an electroconductive film, using stannic chloride as the tin compound. It should be understood, however, that other compounds, particularly other halides of tin, may be used for this purpose. For example, stannic fluoride, stannic iodide, stannic bromide, or the corresponding stannous salts, such as stannous chloride, stannous bromide, etc., may be used. It is also possible to produce electroconductive films using other salts or compounds of tin which are capable of hydrolysis (reaction with water) to produce an oxide of tin. For example, other tin salts, such as stannous oxalate or stannous acetate, etc., may be used either as aqueous solutions or anhydrous solutions. Moreover, solutions of cadmium bromide, cadmium acetate, indium trichloride, etc., also form transparent electroconductive films. Compounds capable of producing electroconductive transparent films may be considered substantial equivalents of stannic chloride, for the purpose of this invention, even though results obtained are not exactly identical. That is, while films of tin oxide can be produced by a variety of tin compounds, the resistivity of many of such compounds is quite high. Nevertheless, in certain special instances, such as where high resistance resistors are desirable, the resistivity of some of these films is not excessive. On the other hand, when it is desired to produce a product having substantial conductivity, for example, having a resistivity below 0.005 ohm centimeters, which may be used in windshields and similar structures, the above listed halides, particularly the stannic halides, have been found to be the most suitable.

Thus, other typical solutions of metal compound which may be used in lieu of stannic chloride solutions set forth above to produce electroconductive films according to this invention, include the following:

A. Stannous acetate _____ grams__ 4
   Methanol _____ milliliters__ 30
   12 normal hydrochloric acid in amount sufficient to dissolve the stannous acetate. (Solution normally aged overnight.)
B. 20 grams zinc acetate—$Zn(C_2H_3O_2)_2 \cdot 2H_2O$
   50 grams water
   5 grams phenyl hydrazine hydrochloride
C. Two parts by volume anhydrous $SnCl_4$
   One part by volume glacial acetic acid
D. 150 grams cadmium acetate
   100 grams water
E. 75 grams cadmium bromide
   100 grams water
   One volume of 30% aqueous hydrogen peroxide per volume of cadmium bromide solution.
F. Saturated indium trichloride in methanol.

The invention is particularly concerned with the production of transparent electrically conducting films upon window or plate glass. Panels so produced are useful as windshields or viewing closures in automobiles, aircraft, railroad passenger cars, etc. In such use, the electroconducting film is provided with a source of electric potential and serves as a heating element for removal of ice, frost, fog, etc., from the window, and for preventing such panels from becoming unduly cold. Various refractory bases which do not fuse or melt at the temperature of treatment, for example, below 1500° F. may be coated with such film. Such refractory bases include glass, such as soda-lime glass or borosilicate glass, mica, metal oxides, such as aluminum oxide, porcelain, glass fibers, quartz, including fused quartz, solid metal silicates, such as aluminum silicate or calcium silicate, stone, and other refractory. Furthermore, metals including tungsten, molybdenum, chromium, iron, steel, etc. may be coated according to the present invention. The uses to which the articles thus produced may be put, depend to a very substantial degree upon the conductivity and transparency of the resulting product. Where the base is transparent, as is the case when the film is deposited upon window or plate glass and where the film also is transparent, the product may be used effectively wherever plate or window glass is used, for example, as viewing closures or windshields in automobiles, airplanes and other vehicles. The refractory coated articles herein contemplated may be used as electrical resistors, insulators, grid leaks, mirrors, radio tube bulbs, and electrical heating elements. Coatings upon metals may be used as rectifier films, and in other uses wherever conductive or semi-conductive oxide type coatings are found to be useful. Cooking utensils, such as coffee pots, and various chemical equipment including flasks and other receptacles may be provided with the coatings herein described, and the coating used to heat the vessel by passage of an electric current therethrough.

The above invention has been described with particular reference to certain specific details of specific embodiments of this invention. It is not intended that such detail shall constitute limitations upon the scope of the invention, except insofar as the invention is limited by the scope of the claims hereof.

What is claimed:
1. A method of providing glass with a trans- parent electroconductive coating during periods when the water content of atmospheric air exceeds 0.01 pound per pound of air, which comprises introducing an aqueous mixture of stannic chloride and water, containing 5 to 60 percent by weight of water into an air stream which is free from suspended drops of water, and contacting the stream with glass heated above 400° F. but below the temperature at which the glass fuses, while maintaining the water content of the atmosphere in which said contact is effected, at 0.00025 to 0.01 pound per pound of air.

2. A method of providing glass with a transparent electroconductive coating during periods when the water content of atmospheric air exceeds 0.01 pound per pound of air, which comprises introducing an aqueous mixture of a hydrolyzable transparent electroconductive film-forming metal salt and water, containing 5 to 60 percent by weight of water into an air stream which is free from suspended drops of water, and contacting the stream with glass heated above 400° F. but below the temperature at which the glass fuses, while maintaining the water content of the atmosphere in which said contact is effected, at 0.00025 to 0.01 pound per pound of air.

WILLIAM O. LYTLE.
ALBERT E. JUNGE.

References Cited in the file of this patent

UNITED STATES PATENTS

| Number | Name | Date |
| --- | --- | --- |
| 2,118,795 | Littleton | May 24, 1938 |
| 2,429,420 | McMaster | Oct. 21, 1947 |